United States Patent [19]

Slapsys et al.

[11] Patent Number: 4,598,521
[45] Date of Patent: Jul. 8, 1986

[54] SUSPENSION CEILING GRID WITH END CONNECTOR

[75] Inventors: Michael Slapsys, Toronto; Brian T. Everitt, Mississauga, both of Canada

[73] Assignee: Donn Incorporated, Westlake, Ohio

[21] Appl. No.: 647,413

[22] Filed: Sep. 5, 1984

[51] Int. Cl.$^4$ .............................. E04B 5/52; E04C 2/42
[52] U.S. Cl. ........................................ 52/484; 52/489; 52/665; 403/187; 403/346
[58] Field of Search ................. 52/665, 484, 489, 478; 403/346, 187, 189, 199

[56] References Cited

U.S. PATENT DOCUMENTS

| | | | |
|---|---|---|---|
| 2,830,683 | 4/1958 | Griffith | 403/346 |
| 3,677,589 | 7/1972 | Roles | 52/665 |
| 3,835,614 | 9/1974 | Downing | 52/484 |
| 4,047,348 | 9/1977 | McSweeney | 52/484 |
| 4,492,066 | 1/1985 | LaLonde | 52/484 |

FOREIGN PATENT DOCUMENTS 2143160 3/1973 Fed. Rep. of Germany ........ 52/665
994701 6/1965 United Kingdom ............... 403/187

*Primary Examiner*—James L. Ridgill, Jr.
*Attorney, Agent, or Firm*—Pearne, Gordon, Sessions, McCoy, Granger, Tilberry

[57] ABSTRACT

A grid system for suspension ceilings is disclosed having an end connector providing an inverted, U-shaped end portion adapted to nest over the upper edge of an associated web of a runner extending through the intersection. An integral tongue is bendable through an aperture formed in such associated web to releasably lock the connector to the through runner. The end connector is mounted between opposed, parallel, vertical webs on the associated runner by tabs which extend through web slots. The separate connectors and the runners can be formed of materials having different thicknesses so that the material forming the web and the material forming the connector can be selected to provide the required strength without excessive use of materials. The connectors can be used both in main run cross-run systems, and in basket weave systems.

12 Claims, 3 Drawing Figures

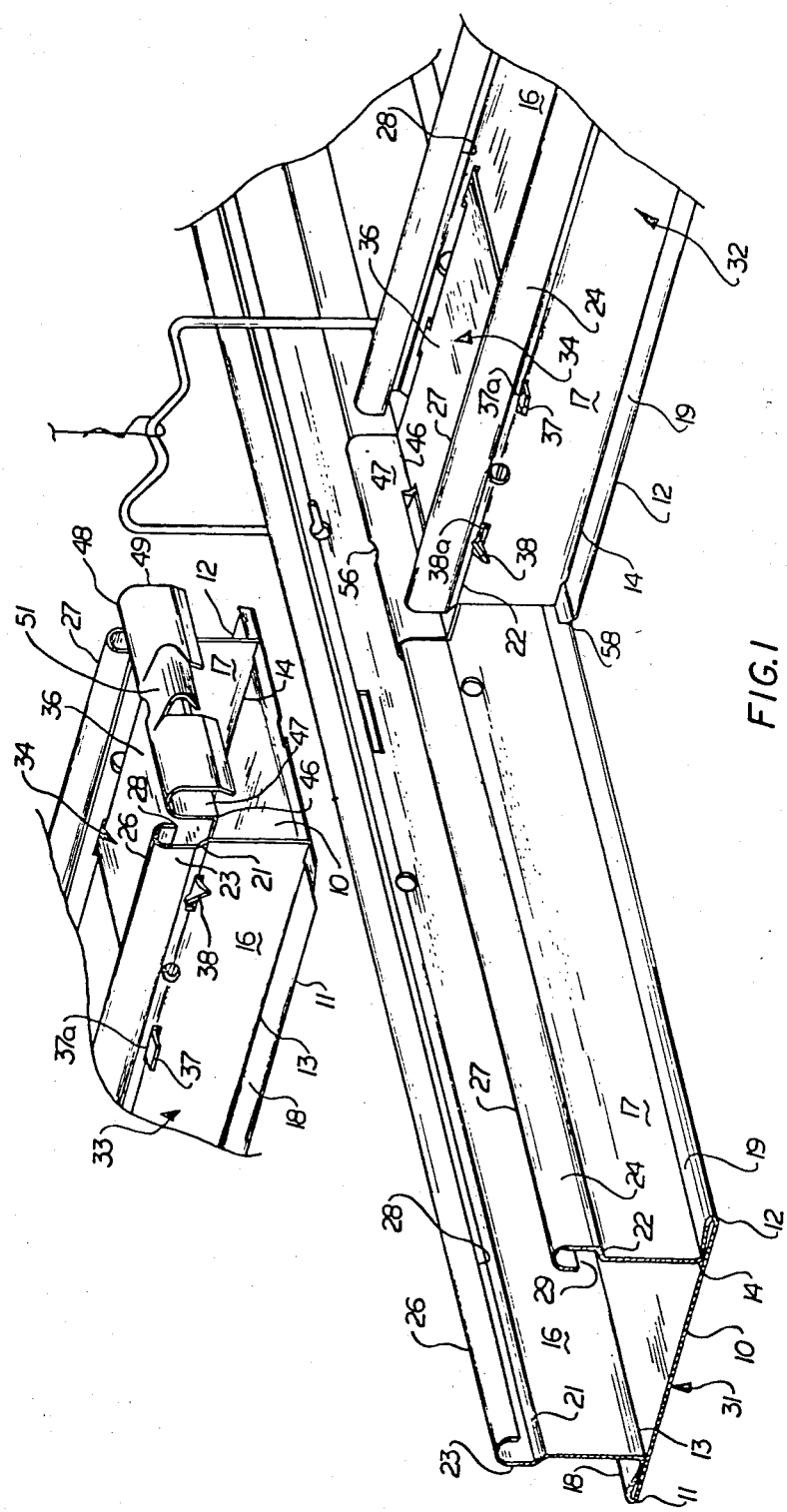

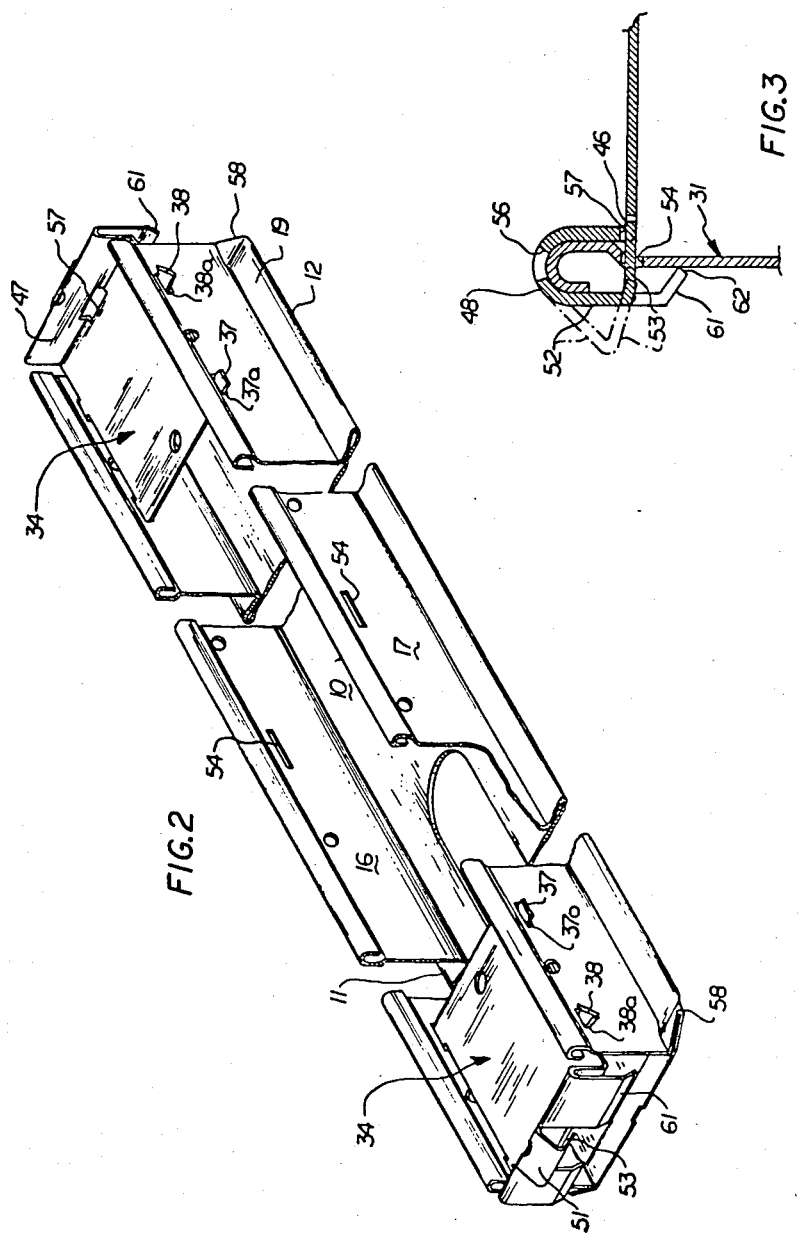

SUSPENSION CEILING GRID WITH END CONNECTOR

BACKGROUND OF THE INVENTION

This invention relates generally to suspension ceiling grid systems, and more particularly to a novel and improved end connector for the runners for such systems.

Prior Art

Wide-face grid runners having a generally U-shaped cross section providing two spaced, upstanding webs are known. U.S. Pat. No. 3,835,614, assigned to the assignee of the present invention, discloses one such runner. Such runners may be installed in typical main run, cross-run grid systems or in basket weave grid systems.

SUMMARY OF THE INVENTION

The present invention provides a novel and improved end connector particularly suitable for use with such wide face grids. Such connector may be used in either a main run, cross-run grid system or in a basket weave grid system. The illustrated embodiment provides a separate end connector mounted between the two webs of a generally U-shaped, wide-faced grid runner. Such mounting is accomplished by providing lateral projections extending into axial web slots.

The connector also provides an inverted, U-shaped portion proportioned to nest or embrace with the upper edge of one web of an associated runner. A tongue is provided on the end connector which is movable through an axial slot in the associated web to securely lock the connector and associated runner against movement in all directions. In the illustrated embodiment, such tongue is provided by a bendable portion integrally formed on the connector.

A runner provided with such connector is installable by vertical downward movement to nest the U-shaped portion on the web and the tongue is then bent into its locked position. Therefore, it is not necessary to move either runner axially relative to the other to any significant extent during installation. This is particularly desirable when installing a given runner in an existing grid system where such axial movement is resisted by the assembled grid runners. The connector is also releasable by vertically upward movement after the tongue is withdrawn from the associated slot. Therefore, the removal of a particular runner from the existing grid system is easily accomplished without any significant axial motion of either runner with respect to the other.

Further, the connector can be installed at virtually any point along an associated runner even where associated slots are not provided to receive the tongue. Such installation is normally not utilized, but the connector is capable of such installation when necessary.

The end connector structure is very simple and can, as in the illustrated embodiment, be economically formed by simple stamping and shaping operations. Further, since the end connector is a separate element, it can be made from a metal of a different thickness than the metal forming the runner itself. Therefore, the runner and the end connector may be respectively formed of sheet metal of different thicknesses, which are selected to provide the required strength for each part of the assembly in an efficient manner.

These and other aspects of this invention are illustrated in the accompanying drawings, and are more fully described in the following specification.

BRIEF DESCRIPTION OF THE DRAWINGS

FIG. 1 is a fragmentary, perspective view of a runner system incorporating the present invention, illustrating an intersection with one runner installed and the opposite runner in position to be installed;

FIG. 2 is a broken, perspective view of one complete runner illustrating the end connectors installed at each end, the connector tongue receiving slots intermediate the ends and air vent openings therein; and FIG. 3 is an enlarged cross section, illustrating the structural detail of the connection and illustrating in phantom the position of the tongue before it is inserted into the tongue receiving slot.

DETAILED DESCRIPTION OF THE DRAWINGS

The present invention is illustrated as applied to a runner system in which the runners are formed of a strip of sheet metal shaped to provide a relatively wide face 10 extending laterally to opposed, reverse bends at 11 and 12. From the reverse bends 11 and 12, the metal extends inwardly to right-angle bends 13 and 14, respectively; from the bends 13, 14, the metal extends upwardly to provide two spaced, upstanding webs 16 and 17, respectively. The upper surface of the metal between the respective bends 11 and 13 and 12 and 14 provides panel supporting flanges 18 and 19.

In the illustrated embodiment, the upper edges of the web 16 and 17 are provided with an outwardly extending offset 21 and 22, respectively, from which upper web walls 23 and 24 extend. From the web walls 23 and 24, the metal is formed with an open reverse bend at 26 and 27, and extends therefrom to a downwardly facing edge at 28 and 29, respectively. The offsets 21 and 23 and bends at 26 and 27 provide a stiffening rib along the upper edges of each of the webs. The particular cross section illustrated and just described is typical of a wide-face grid having a generally U-shaped section providing two spaced webs. It should be understood, however, that variations in such structure are typically provided and that the exact structure illustrated and described is only illustrative of one typical runner cross section.

Referring to FIG. 1, a typical intersection in a suspension ceiling grid system includes a first runner 31 which extends through the intersection and two opposed runners 32 and 33 which connect to the through runners 31 on opposite sides thereof in an aligned manner. Such an intersection is typical of both a main run cross-run grid system and a basket weave grid system. However, usually in a main run cross-run grid system, main runs are provided with end connectors which permit main runners to be interconnected endwise to provide a relatively long main run and cross runners are provided with end connectors which are adapted to be interconnected with the main run runners at intervals along the length of the main run. In a basket weave system generally, similar runners are interconnected to provide substantially all of the runs of the grid system. In such system, a typical runner is provided with similar end connectors at its ends and is adapted to receive such end connectors of an associated runner at at least one location midway between its ends. In many cases, the runners are also adapted to connect with two additional short runners to divide the modules in half.

Each of the intersecting opposed runners 32 and 33 is provided with a separate end connector 34. Such end connector is again formed of sheet metal. The structure of the end connectors 34 on the two runners 32 and 33 is identical.

Each connector 34 is provided with a planar mounting portion 36 which extends lengthwise of the runner between the webs 16 and 17 and provides two spaced, lateral projections 37 and 38 along each side which extend through an associated one of two mating web slots 37a and 38a formed in the webs 16 and 17, substantially adjacent to the respective offsets 21 and 22. At least one pair of the projections 37 or 38 (37 in the illustrated embodiment) is twisted to lock the webs against accidental web separation movement to ensure that the end connector remains in its mounted position.

The end connectors 34 are installed on the associated runner by first inserting the projections 37 and 38 along one side into associated slots 37a and 38a, and then springing the webs apart to allow movement of the other projections into alignment with the associated slots so that when the force pushing the webs apart is released, the webs snap back to their original position and the respective projections extend through the associated web mounting slots. As mentioned previously, one or more of the projections 42 can then be bent or twisted to ensure that the end connector does not inadvertently become released during handling of the runner.

The mounting portion 36 extends beyond the end of the associated runner to a first right-angle bend at 46 and therefrom upwardly along a first upstanding wall 47. At the upper end of the wall 47, the metal is reversely bent in a relatively open bend 48, and from such bend extends downwardly along a wall portion 49 spaced from the wall 47 to provide a generally inverted, U-shaped channel proportioned to nest or embrace the upper edge of an associated web, as illustrated in FIG. 1, with the connection between the runners 31 and 32.

A central tongue portion 51 is cut from the material of the mounting clip and separates the downwardly extending wall portion 49 into two parts, with one on each side of the tongue 51. Such tongue, prior to installation, is inclined downwardly and forwardly from the bend 48 along an upper portion 52, as best illustrated in phantom in FIG. 3, and then inwardly along a lower portion 53. After the end connector is nested over the upper edge of the associated web, the tongue is bent from the phantom line position of FIG. 3 inwardly, causing the lower tongue portion 53 to project in through a tongue-receiving slot 54 formed in the associated web to an installed position, as illustrated in full line in FIG. 3. In such position, the connector provides positive locking of the runner 32 on the runner 31, and the runners are restrained from motion in all directions.

An aperture 56 is formed at the intersection of the upper tongue portion 52 and the wall portion 47 to provide in effect a hinge line, so that when the tongue is bent into its locked position, the material forming the tongue bends easily with a hingelike movement at such junction.

Further, the mounting portion 36 and the vertical wall 47 are cut away to provide an aperture 57 to receive the extremity of the lower portion 53 of the tongue, as best illustrated in FIG. 3.

The ends of the runners 32 and 33 are formed with an offset at 58 having a height at least equal to the height of the flange 18 or 19, which extends over the flange a short distance. Preferably, the various tolerances are arranged so that such offset determines the vertical position of the connected runners with respect to the through runner. Therefore, accurate vertical positioning is achieved even if there is a small amount of looseness in the mounting of the connectors on the ends of the associated runners.

If it is desired to disconnect the connection, a tool, such as a screwdriver, may be pushed against the end of the tongue to push it out through the aperture 57 on slot 54. Then, such tool can be inserted through the aperture 56 to lever the tongue 51 back out to its phantom position, after which the end of the runner can be raised to complete the disconnection.

This structure, which provides for vertical movement of an end of a runner into the connected position, or from the connected position when disassembly is required, is particularly desirable when it is desired to remove and/or install a particular runner within an existing grid system. Generally, most prior art grid runner connectors require axial movement of the end connector into an aperture formed in the through runner, but in an assembled grid, such axial movement is restrained to a considerable extent by the related runners of the grid system. On the other hand, vertical movement of the magnitude necessary to connect and disconnect runners in accordance with the present invention is not significantly restrained by the related grid runners.

In most instances, the runners are assembled in a predetermined pattern, with connections occurring at predetermined locations along the length of the through runners. At such locations, the web apertures 54 are formed so that when the tongue 51 is moved through the aperture, there is an automatic positioning of the connected runners with respect to the through runner. Proper positioning is easily achieved because the slot 54 can be seen through the aperture 57 when the runners are properly positioned.

In some instances it may be desired to locate a runner at a location along the through runner which is not a normal interval. With a connector in accordance with this invention, such installation can be made by merely nesting the end connector over the upper end of the associated web without deforming the tongue 51 for positive locking. A hole can then be drilled and a screw threaded through the parts to provide positive locking of the parts.

In the illustrated embodiment, the downwardly projecting walls 49 are bent inwardly a small amount at 61 so that the ends 62 engage the inner sides of the webs to prevent any looseness between the runners which could cause objectionable rattling noise. However, the inturned portion 61 is spaced a sufficient distance below the bend at 46 so that the bulb of the associated runner can pass therebetween during installation or removal of the runners.

Because the end connectors 34 are formed as a separate piece, the thickness of the material used to form the end connectors does not have to be the same as the thickness of the material used to form the runners themselves. Therefore, the runner material thickness and the connector material thickness can be different, and it is possible to select the thickness of the various parts of the assembly to provide an efficient utilization of the material forming the assembly. In most instances, the material used to form the runner is not as thick as the material used to form the connectors even though in the drawings, there has been no attempt to specifically indicate the relative thicknesses of the parts because the runner material thickness is exaggerated for purposes of illustration.

With the present invention, an end connector is provided which is easily and economically formed by simple stamping and forming operations. Further, the longitudinal slots required on the runners themselves are easily and economically formed during the manufacture of the runner per se.

Although the preferred embodiment of this invention has been shown and described, it should be understood that various modifications and rearrangements of the parts may be resorted to without departing from the scope of the invention as disclosed and claimed herein.

What is claimed is:

1. Elongated runners for suspension ceiling grid systems, each of said runners comprising a piece of sheet metal formed to provide a face portion extending laterally to opposed inwardly extending flanges adapted to engage and support ceiling panels, and a pair of laterally spaced substantially parallel upstanding webs, said webs extending to laterally spaced upper edges having predetermined dimensions and providing locking apertures spaced from the ends of said runner, and a separate metal end connector means connected between said webs at at least one end of at least one of said runners, said end connector means providing an inverted U-shaped portion at the end thereof sized to fit over said upper edge of an associated web of another of said runners and prevent relative axial movement of said connector with respect to an associated web, said end connector means also providing an integral tongue bendable to move the end thereof through said locking aperture from the side of said adjacent web between said webs after said U-shaped portion is positioned on said associated web to releasably lock said runner against movement relative to said associated web.

2. Elongated runners as set forth in claim 1, wherein said upper edge of said web is provided with a bulb providing laterally spaced walls, and said U-shaped portion is sized to embrace said spaced walls of said associated web to prevent relative axial movement therebetween.

3. Elongated runners as set forth in claim 1, wherein said U-shaped portion is provided by two laterally spaced parts and said tongue is positioned intermediate said parts.

4. Elongated runners as set forth in claim 1, wherein said webs are provided with mounting slots substantially adjacent to said upper edges thereof, and said connector provides a mounting portion providing lateral tabs projecting through said mounting slots securing said connectors to said runners.

5. Elongated runners as set forth in claim 1, wherein said connectors are formed of sheet metal bent to provide said U-shaped portions having a base, and said tongue is joined to said base and provides a first leg extending from said base and a second leg at the end of said first leg remote from said base extending at a substantial angle with respect to said first leg, said first leg being bendable with a hingelike movement at its end remote from said second leg to move said second leg into and out of said locking aperture.

6. A suspension ceiling grid structure comprising a plurality of runners connected to each other at intersections, said intersections providing a first runner extending through said intersections, and a second runner connected at its end to said first runner and extending substantially perpendicular to said first runner, said first and second runners each providing a face portion extending to opposed inwardly extending flanges adapted to engage and support ceiling panels and a pair of laterally spaced and opposed webs each extending to an upper edge, said second runner providing a connector at said end thereof, said connector providing an inverted U-shaped portion providing spaced legs joined at a base, said U-shaped portion fitting over said upper edge of the adjacent web of said first runner with a close fit for preventing axial movement of said second runner with respect to said first runner while permitting upward movement of said end of said second runner relative to said first runner to disconnect the connection therebetween, said adjacent web providing a locking aperture therein at said intersection, said connector providing a tongue removably extending through said locking aperture operating to prevent said upward movement of said end of said second runner relative to said first runner, said tongue in cooperation with said U-shaped portion preventing relative movement between said runners, said second runner providing spaced slots in said webs substantially adjacent to the upper edges thereof, said connector providing a mounting portion extending between said webs substantially adjacent to the upper edges thereof and providing tabs extending through said slots securing said connector to said second runner.

7. A suspension ceiling grid system as set forth in claim 6, wherein said intersections include third runners similar to and aligned with said second runners connected to the web of said first runner remote from said second runner.

8. A suspension ceiling grid system as set forth in claim 6, wherein the ends of said U-shaped portion remote from said second runner are inturned to engage the side of said adjacent web remote from said second runner with an interference fit to prevent looseness in the connection between said first runner and said second runner.

9. A suspension ceiling grid system as set forth in claim 6, wherein said connector provides an opening aligned with said locking aperture through which said locking aperture can be viewed to properly position said runners during assembly of said grid.

10. A suspension ceiling grid system as set forth in claim 9, wherein said tongue is accessible through said opening to provide access to move said tongue out of said locking aperture for disassembly of said second runner.

11. A suspension ceiling grid system as set forth in claim 6, wherein said tongue is integrally formed with said connector and is joined thereto with a bendable section which bends with a hingelike movement to position said tongue in said locking aperture and to remove said tongue therefrom.

12. A suspension ceiling grid system as set forth in claim 11, wherein an opening is provided at the junction between said tongue and said connector to cause said hingelike movement and to receive a tool to bend said tongue for removal of said tongue from said locking aperture.

* * * * *